Dec. 10, 1957   C. M. ECHEVERRIA, JR   2,815,821
HELICOPTER ROTOR BLADE CONNECTION
Filed March 24, 1955   3 Sheets-Sheet 1

INVENTOR
CHARLES M. ECHEVERRIA, JR.
BY M. B. Tasker
ATTORNEY

Dec. 10, 1957  C. M. ECHEVERRIA, JR  2,815,821
HELICOPTER ROTOR BLADE CONNECTION
Filed March 24, 1955  3 Sheets-Sheet 3

INVENTOR
CHARLES M. ECHEVERRIA, JR.
BY
ATTORNEY

United States Patent Office 2,815,821
Patented Dec. 10, 1957

2,815,821

HELICOPTER ROTOR BLADE CONNECTION

Charles M. Echeverria, Jr., Milford, Conn., assignor to United Aircraft Corporation, East Hartford, Conn., a corporation of Delaware Application March 24, 1955, Serial No. 496,445

10 Claims. (Cl. 170—160.55)

This invention relates to rotary wing aircraft and particularly to improved rotor heads for the sustaining rotors of such aircraft of the type which have fully articulated blades.

In such a rotor head the root end of each blade is connected to the rotor head for flapping movement, for movement in the plane of rotation, and for movement about a pitch changing axis which is usually coincident with the longitudinal axis of the blade.

It is an object of the present invention to provide an improved spherical bearing support which will permit all of the above-mentioned movements of the blade relative to the hub.

Another object of the invention is to provide an improved rotor head in which the blades are supported by hydrostatic bearings.

A further object of the invention is generally to improve the means for attaching fully articulated rotor blades to the rotor hub.

These and other objects and advantages of the invention will become evident or will be pointed out hereinafter in connection with the following detailed description of two preferred embodiments of the invention shown in the accompanying drawings.

Figure 1:
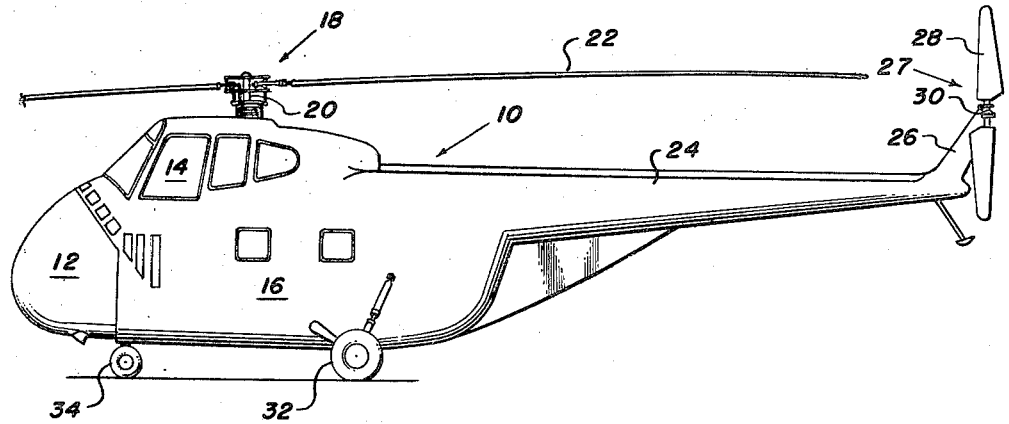
Fig. 1 is a side elevation of a helicopter having a rotor head constructed in accordance with my invention.

As shown in Fig. 1, the helicopter embodying this invention includes an elongated body 10 which contains a forward engine compartment 12 and upper pilot compartment 14 and a cargo or passenger compartment 16. A main lifting rotor 18 is mounted for rotation about an upright drive shaft 20 extended upwardly from the body 10 having a plurality of rotor blades 22. The body 10 has a rearwardly extending tail cone 24 which terminates in a pylon 26 which supports a tail rotor 27 rotatable about a transverse axis 30. The tail rotor has variable pitch blades 28 which are controllable from the pilot's compartment 14 to compensate for main rotor torque and provide for directional control of the helicopter in a usual manner. The helicopter is supported on main landing gear 32 provided with usual oleo struts and on a pair of forward nose wheels 34.

Figure 5:
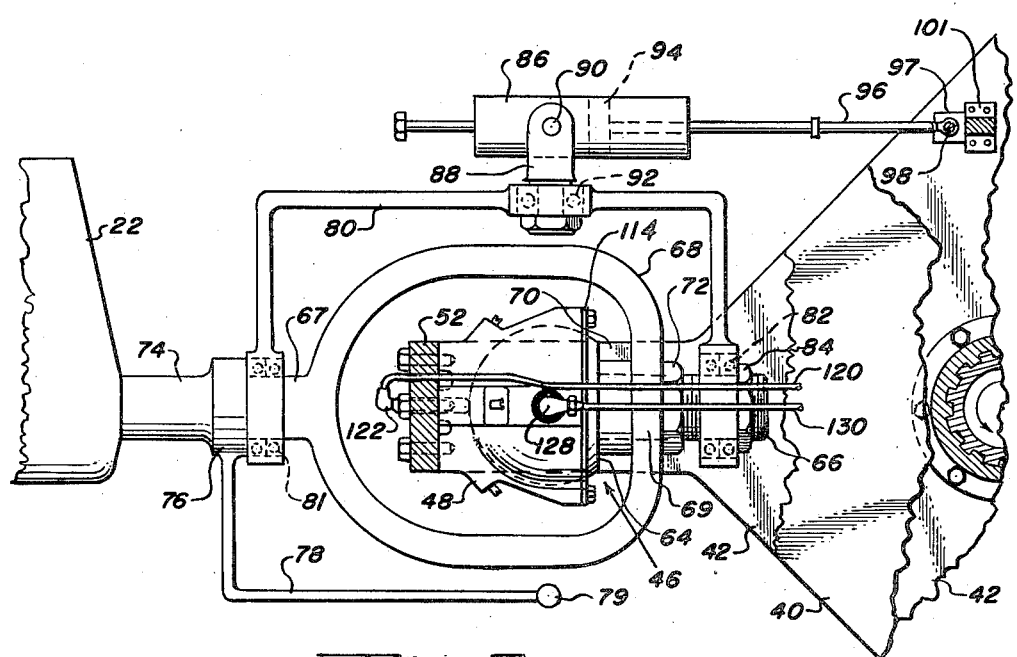
Fig. 5 is a plan view of the rotor head in the vicinity of a blade attachment showing my invention installed in a helicopter rotor head, wherein the ball element is attached to the rotor blade and the socket element is mounted on the hub, parts being broken away to facilitate illustration.
Figure 6:
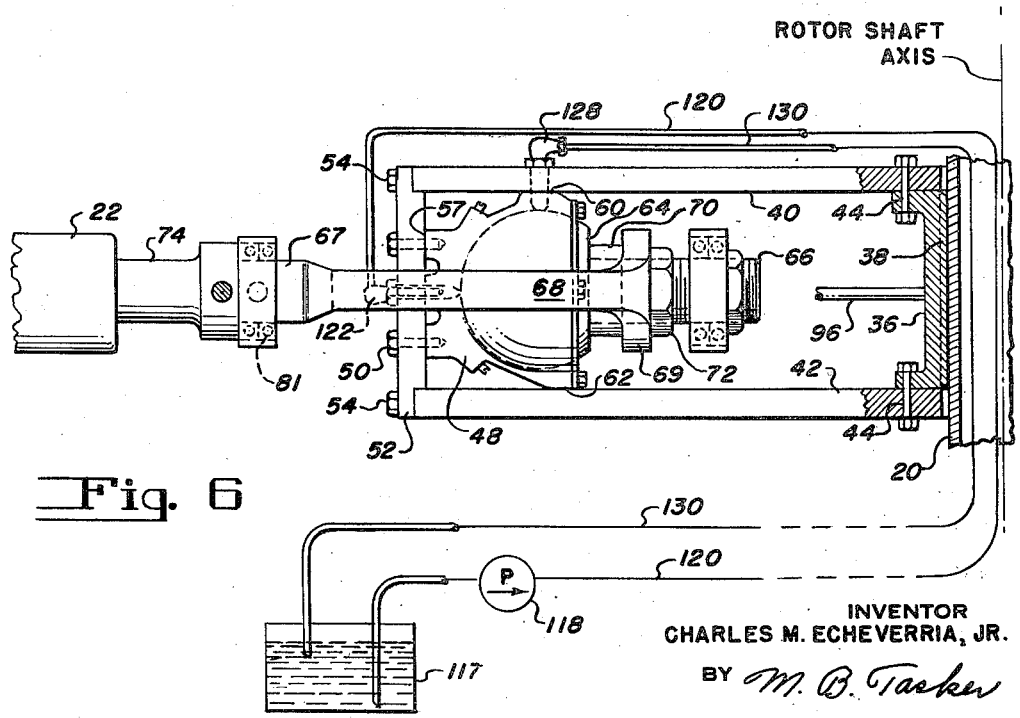
Fig. 6 is a side elevation of Fig. 5.

The rotor head as shown in detail in Figs. 5 and 6 includes a spool 36 having a splined connection 38 to the main rotor drive shaft 20. Spool 36 carries upper and lower star plates 40 and 42 and spaces these plates apart, the plates being secured by bolts 44 to the upper and lower flanges of the spool. The rotor head of the helicopter shown has three blades and, accordingly, the star plates 40 and 42 have three points to each of which the root end of a blade is secured.

Figure 3:
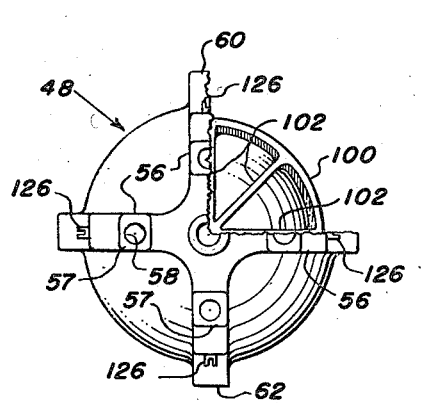
Fig. 3 is an end view of Fig. 2.

In accordance with the present invention a ball and socket bearing supports each blade 22 in the rotor head 18 which, as shown in Figs. 5 and 6, consists essentially of a truncated sphere 46 carried by the blade and a cooperating socket 48 mounted between the plates 40 and 42. The socket element 48 is secured by four cap screws 50 to an end plate 52 which connects the extremities of the star plates 40 and 42, the end plate being secured to the star plates by cap screws 54. It will be noted from Fig. 3 that socket element 48 of the bearing has four radial end ribs 56, each of which has a flat faced boss 57 provided with a threaded socket 58 for one of the cap screws 50. The socket element 48 also has flat upper and lower surfaces 60 and 62 (Fig. 6) which are closely received between the plates 40 and 42 and further support the socket rigidly between the plates.

The ball element 46 has a portion removed to provide a flat surface 64 (Fig. 2) and has projecting from this surface a stub shaft 66 which may be integral with the ball or may be otherwise secured therein. Preferably, this shaft is hollow, as shown herein, and of substantial diameter and carries a closed yoke 68 the end wall of which is provided with a widened apertured portion 69 to receive the stub shaft 66. This attachment consists of a spacer ring 70 between the portion 69 of yoke 68 and surface 64 and a nut 72 which is threaded onto the stub shaft 66, thus rigidly securing ball element 46 to the inboard end of yoke 68. The yoke 68 at its outboard end has a stem 67 rigidly fixed to the root end 74 of the blade. Root end 74 of the blade has an integral collar 76 which carries a blade horn 78 terminating in a universal joint 79 by which it is connected to the usual control linkage. Collar 76 also forms an abutment for a bearing 81 on one arm of a yoke 80. The other and similar arm of yoke 80 is mounted on stub shaft 66 by a bearing 82 and yoke 80 is held in place by a nut 84. Yoke 80 supports cylinder 86 of a hydraulic damper which is mounted in a yoke 88 on trunnions 90, the yoke 88 being provided with a swivel bearing 92 in yoke 80. The piston 94 of the damper has a piston rod 96 which is connected to a vertical pin 98. Pin 98 is supported on a bracket 97 carried by a support 101 which is connected between upper and lower plates 40 and 42.

Figure 2:
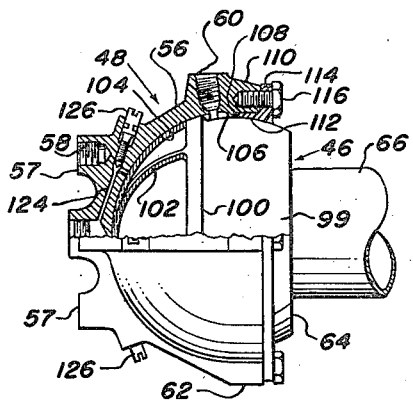
Fig. 2 is a side elevation of the improved ball and socket blade root mounting of my invention with parts shown in section.
Figure 4:
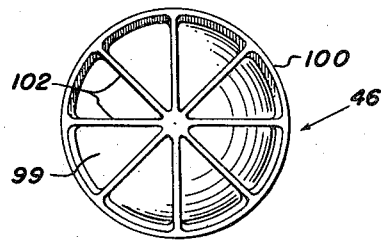
Fig. 4 is a detail view of the ball element of Fig. 3.

As shown most clearly in Figs. 2 and 4, the ball 46 has a basic spherical surface 99 above which it is provided with a plurality of raised lands on the outboard portion thereof which also conform to the surface of a larger sphere. The surfaces of these lands have a very accurate lapped fit with the spherical surface of the socket. One of these lands 100 is an annular band into which a plurality of radial bands 102 are smoothly merged over the entire outboard surface of the ball which takes the centrifugal load developed by the rotating blade. These lands cooperate with the inner spherical surface 104 of socket 48 over a sufficient area to permit flapping movements of the blade as well as fore and aft movements of the blade in the plane of rotation and, of course, pitch changing movements of the blade about the blade axis. Adjacent the mouth of the socket a narrow annular flange 106 is provided which engages the spherical surface 99 of ball element 46 and seal 108 is provided in the space between the lip 110 of the socket and the spherical surface 99 of the ball. The seal is held in place by an annular flange 112 of a ring 114 which is bolted to the face of socket element 48 by bolts 116. The inner surface of flange 112 is concave and closely fits the spherical surface 99 of ball element 46. As is usual, when the seal is in the form of an O-ring it is compressed between the surface of lip 110 and the confronting surface 99 but the distance between flange 106 and the end of flange 112 is somewhat greater than the dimension of the compressed O-ring packing.

A lubricating fluid under high pressure is introduced into the space between the spherical surface 99 and the inner surface of socket element 48 from fluid reservoir 117 by pump 118 through a conduit 120, fitting 122, which extends through end plate 52 into socket element 48, and passages 124, as shown most clearly in Fig. 6 and Fig. 2. It will be noted that there are four passages 124 (Fig. 2), one in each of the ribs 56. Also, it will be noted that if found necessary an externally adjustable needle valve 126 can be provided in each of the passages 124 to control the amount of fluid introduced into the socket.

The pressure used may be as high as 3000 p. s. i. and it is inevitable that there will be a certain amount of leakage past the land 100 since there is continuous movement between the ball and socket in flight. To this end a fitting 128 is provided which extends through plate 40 into socket element 48 and communicates with the annular space between land 100 and flange 106 where any leakage fluid collects and is drained through the fitting 128 and conduit 130 to reservoir 117.

It will be evident that in the construction as described in Figs. 1–6 the rotor blade 22 is free to flap through a substantial angle, to move fore and aft in the plane of blade rotation, and to move about its pitch changing axis or to move in any combination of these three movements, it being understood that suitable limit stops (not shown) are provided to restrain the blade from moving too far in any direction. The centrifugal forces developed by the rotating blade are transmitted from the ball element 46 to the bottom of surface 104 of socket element 48 primarily by the hydraulic cushion of the lubricating fluid under pressure from pump 118, which acts between surfaces 99 of the ball element 46 and surface 104 of the socket element 48, and by lands 100 and 102 of ball element 46 which are inherently protected by a film of the lubricant.

Figure 7:
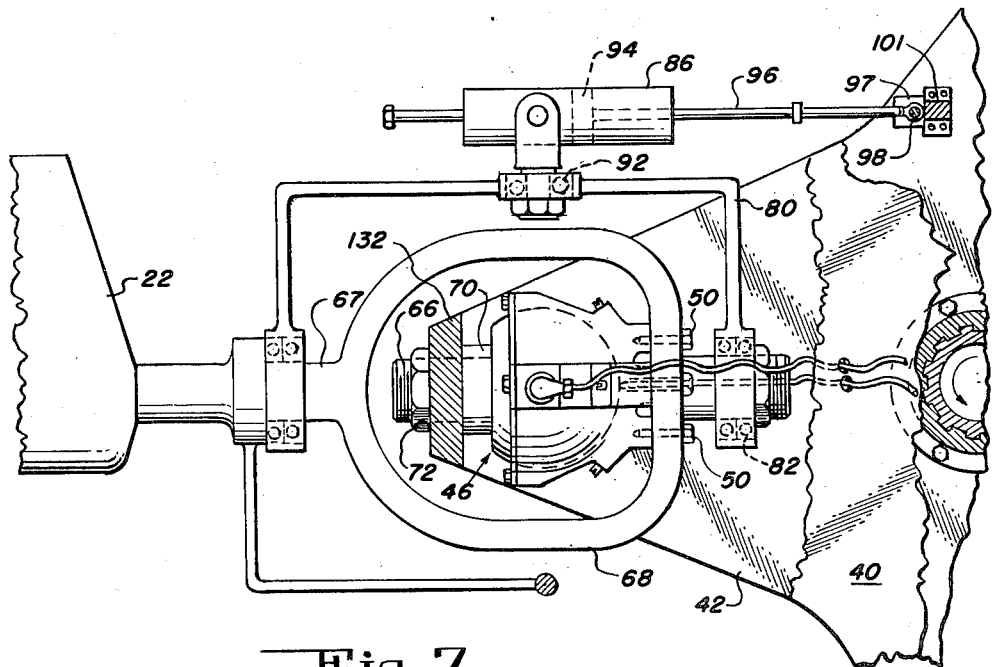
Figs. 7 and 8 show plan and elevation views respectively of a modified construction in which the ball element is carried by the rotor hub and the socket element is carried by the blade.
Figure 8:
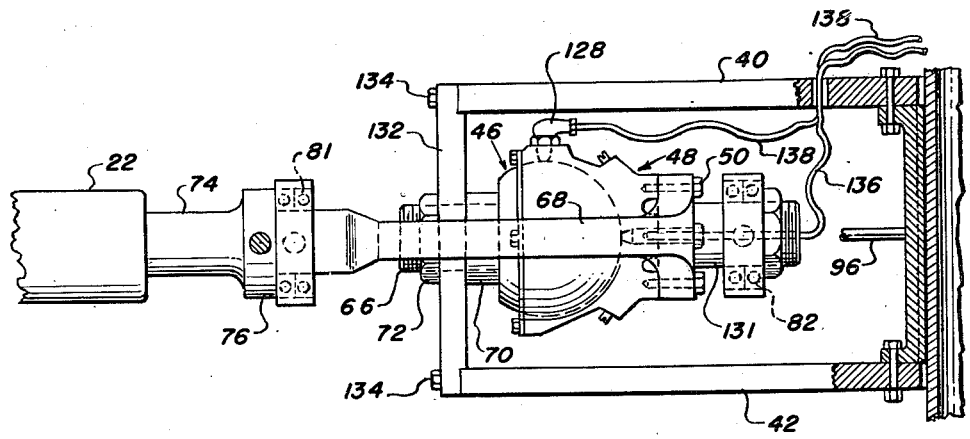

The modification shown in Figs. 7 and 8 is essentially the same as that shown in Figs. 5 and 6 except that the socket element 48 is carried by yoke 68 of the blade, cap screws 50 extending through the yoke and being threaded as before into the four threaded sockets 58 of the socket element. Yoke 68 in this case is provided with a threaded stud 131 which may be welded thereto and lies in the pitch changing axis of the blade for the purpose of supporting the bearing 82 for the damper supporting yoke 80. The ball element 46 is spaced from the end plate 132 which connects the star plates 40 and 42 by spacing collar 70 and is secured thereto by nut 72 threaded on stub shaft 66. The end plate 132 is secured to the upper and lower star plates 40 and 42 by bolts 134. In this modification the high pressure fluid is introduced through a flexible conduit 136 which passes through upper plate 40 and an axial passage in threaded stud 131 and enters passages 124 in the socket. Return fluid flows through fitting 128 and a flexible pipe 138.

In this modification as in the construction of Figs. 1–6, the centrifugal loads of the rotating blades are transmitted from the socket element 48 to the ball element 46 through the fluid under pressure acting between surface 99 of the ball element 46 and surface 104 of the socket element 48 and, the lands 100 and 102 of the ball element by the inner socket wall, these surfaces being separated as before by a film of lubricating fluid.

It will be evident that as a result of this invention an extremely simple and rugged ball and socket construction has been provided which replaces the former flapping hinge, drag hinge and pitch changing bearing heretofore used in articulated rotor blades. The new construction also has the advantage of being very compact, light in weight and, above all, free from the liability of structural failure.

While I have shown two embodiments of my invention herein for purposes of illustration, it will be obvious that various changes may be made in the construction and arrangement of the parts without departing from the scope of the invention.

I claim:

1. A universal attachment for mounting the root end of a rotor blade on a rotor head comprising ball and socket elements, one of which is carried by said rotor head and the other of which is carried by said blade, one of the cooperating surfaces of said elements having lands formed thereon providing limited areas of engagement with the cooperating surface of the other element, one of said lands comprising a continuous band transverse to the longitudinal axis of the blade, means for supplying fluid to said socket on the side of said continuous land adjacent said blade and means for venting leakage fluid from said socket on the opposite side of said land.

2. A universal attachment for mounting the root end of a rotor blade on a rotor head comprising ball and socket elements, one of which is carried by said rotor head and the other of which is carried by said blade, one of the cooperating surfaces of said elements having lands formed thereon providing limited areas of engagement with the cooperating surface of the other element, one of said lands comprising a continuous band extending transverse to the longitudinal axis of the blade, continuous sealing means also extending transverse to the longitudinal axis of said blade and spaced from said continuous land on the side of the latter remote from said blade, means for introducing fluid under pressure into said socket on the side of said continuous land adjacent said blade, and means for venting leakage fluid from the space between said continuous land and said sealing means.

3. A rotor head for rotary wing aircraft comprising a rotor drive shaft, a hub driven by said shaft, a plurality of upper and lower radially extending arms operatively connected to said hub, a plurality of rotor blades generally radially disposed about said hub, each rotor blade having a yoke at its root end extended between a pair of said upper and lower arms, a member connecting said pair of said arms at each blade location and extending through the blade yoke at said location, and means for connecting the root of each blade with said hub including cooperating ball and socket elements, said ball element having a stub shaft secured to the inboard end of said yoke with the ball element extended within said yoke, said socket element being secured to said arm connecting member and having its open end facing inboard to receive said cooperating ball element.

4. A rotor head for rotary wing aircraft comprising a rotor drive shaft, a hub driven by said shaft, a rotor blade having a closed yoke at its root end, and means for connecting the root end of said blade to said hub including cooperating ball and socket elements, said ball element comprising a truncated sphere having a stub shaft projecting from the truncated portion thereof, said shaft being secured to the closed end of said yoke with said ball element projecting in an outboard direction, and means for supporting said socket member in said hub within said yoke with its open face projecting inboard in position to receive said ball element, and means carried by the open face of said socket member for cooperating with said ball element to hold the latter against displacement from said socket.

5. A rotor head for rotary wing aircraft comprising a rotor drive shaft, a hub driven by said shaft having upper and lower star plates, a plurality of rotor blades generally radially disposed about said hub, each having a yoke at its root end extended between and parallel with said plates, a member connecting said plates at each blade location and extending through said yoke at said location, and means for connecting the root of each blade with said hub including cooperating ball and socket elements, said ball element being mounted on the inside face of said plate connecting member and said socket member being mounted on the confronting face of the inboard end of said yoke with its open face extended outboard to receive said ball element, and means carried by the lip of said socket element for retaining said ball element in said socket.

6. A rotor head for rotary wing aircraft comprising a rotor drive shaft, a hub driven by said shaft, a plurality of rotor blades generally radially disposed about said hub, each having an axial shank and a yoke carried by said shank, means for connecting the yoke of each blade with said hub including cooperating ball and socket elements, one carried by said hub and extending inboard and the other carried by the inboard portion of said yoke and extending outboard, a stud carried by the inboard portion of each yoke and extending inboard in alignment with the shank of the blade associated therewith, a laterally extending damper supporting yoke having yoke ends journalled on said blade shank and on said stud, and a damper including cylinder and piston elements controlling the movements of said blade in the plane of blade rotation, one of said damper elements having a universal mounting on said laterally extending yoke and the other having a pivotal connection with said hub.

7. A rotor head for rotary wing aircraft comprising a rotor drive shaft, a hub driven by said shaft, a plurality of rotor blades generally radially disposed about said hub, each having an axial shank and a yoke carried by said shank means for connecting the yoke of each blade with said hub including cooperating ball and socket elements, one carried by said hub and extending inboard and the other carried by the inboard portion of said yoke and extending outboard, and means for controlling the movement of each of said blades in the plane of blade rotation including a stud carried by the inboard portion of each yoke and extending inboard in alignment with the shank of the blade, a laterally extending damper supporting yoke having yoke ends journalled on said blade shank and on said stud, and a damper including piston and cylinder elements, one of said damper elements having a universal mounting on said laterally extending yoke which lies in the horizontal axis of blade flapping movement extended through the center of said ball and socket elements and the other element having a pivotal connection with said hub.

8. In a rotor head, a spool, a drive shaft, said spool being drivingly connected to said drive shaft, an upper star plate fixed to the upper part of said spool, a lower star plate fixed to the lower part of said spool, said upper and lower star plate having the same number of projecting arms, the arms of said upper star plate each being located over an arm of the lower star plate, an end plate connecting the ends of each pair of corresponding arms, a socket connected to each end plate, the open portion of each socket facing the axis of said drive shaft, a ball located in each socket, a shaft extending from each ball towards the axis of said drive shaft, a yoke extending around each ball and socket, each of said yokes extending around the cooperating end plate to which its respective ball is attached, each of said yokes being connected at one end to the shaft extending from the cooperating ball, the other end of each yoke having a blade attached, the movement between each ball and socket permits each blade to move on a feathering axis, drag axis and flapping axis.

9. In a rotor head, a spool, a drive shaft, said spool being drivingly connected to said drive shaft, an upper star plate fixed to the upper part of said spool, a lower star plate fixed to the lower part of said spool, said upper and lower star plate having the same number of projecting arms, the arms of said upper star plate each being located over an arm of the lower star plate, an end plate connecting the ends of each pair of coresponding arms, a socket connected to each end plate, the open portion of each socket facing the axis of said drive shaft, a ball located in each socket, a shaft extending from each ball towards the axis of said drive shaft, a yoke extending around each ball and socket, each of said yokes extending around the cooperating end plate to which its respective ball is attached, each of said yokes being connected at one end to the shaft extending from the cooperating ball, the other end of each yoke having a blade attached by a shank, the movement between each ball and socket permits each blade to move on a feathering axis, drag axis and flapping axis, a laterally extended damper supporting yoke having yoke ends journalled on said blade shank and on said shaft, and a damper including cylinder and piston elements controlling the movements of said blade in the plane of blade rotation, one of said damper elements having a universal mounting on said laterally extended yoke and the other having a pivotal connection with a star plate.

10. In a rotor head, a spool, a drive shaft, said spool being drivingly connected to said drive shaft, an upper star plate fixed to the upper part of said spool, a lower star plate fixed to the lower part of said spool, said upper and lower star plate having the same number of projecting arms, the arms of said upper star plate each being located over an arm of the lower star plate, an end plate connecting the ends of each pair of coresponding arms, a socket connected to each end plate, the open portion of each socket facing the axis of said drive shaft, a ball located in each socket, a first shaft extending from each ball towards the axis of said drive shaft, a first yoke extending around each ball and socket, each of said first yokes extending around the cooperating end plate to which its respective ball is attached, each of said first yokes being connected at one end to the shaft extending from the cooperating ball, the other end of each first yoke having a second shaft extending therefrom, a blade attached to each second shaft, the movement between each ball and socket permits each blade to move on a feathering axis, drag axis and flapping axis, a first rotatable collar on each of said first shafts, a second rotatable collar on each of said second shafts, a second yoke connecting each first and second rotatable collar on each first yoke, a cylinder attached to each second yoke by a universal mounting, and a piston in each cylinder, each piston having a pivotal connection with a star plate.

References Cited in the file of this patent

UNITED STATES PATENTS

| 1,895,043 | Macaluso | Jan. 24, 1933 |
| 2,245,251 | Chilton | June 10, 1941 |
| 2,344,266 | Reissner | Mar. 14, 1944 |
| 2,521,731 | Kennedy | Sept. 12, 1950 |
| 2,638,994 | Buivid | May 19, 1953 |
| 2,684,272 | Annen | July 20, 1954 |
| 2,695,198 | Brugger | Nov. 23, 1954 |

FOREIGN PATENTS

| 656,050 | Great Britain | Dec. 30, 1948 |